Sept. 28, 1926.  1,601,247
A. GARBARINI
APPARATUS FOR THE PRODUCTION AND MAINTENANCE AND UTILIZATION
OF VIBRATORY MOTION
Filed July 13, 1923   3 Sheets-Sheet 1

Inventor
André Garbarini
By [signature] Atty

Sept. 28, 1926. 1,601,247
A. GARBARINI
APPARATUS FOR THE PRODUCTION AND MAINTENANCE AND UTILIZATION
OF VIBRATORY MOTION
Filed July 13, 1923 3 Sheets-Sheet 2
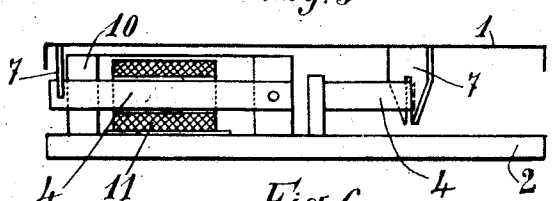
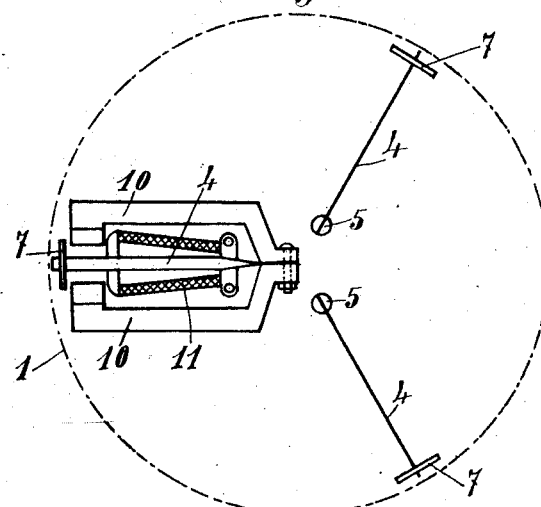
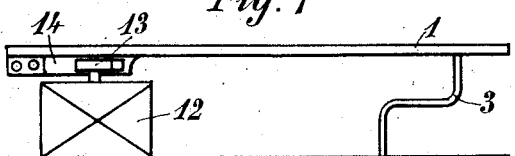
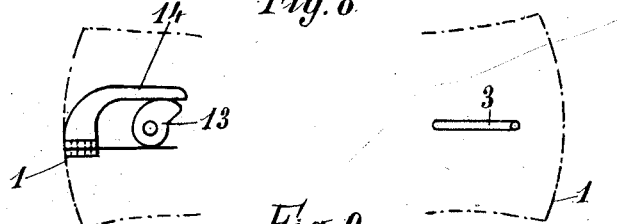
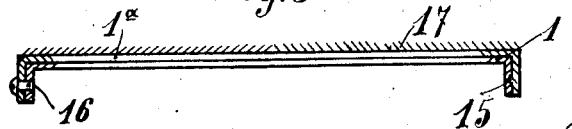

Sept. 28, 1926.  1,601,247
A. GARBARINI
APPARATUS FOR THE PRODUCTION AND MAINTENANCE AND UTILIZATION
OF VIBRATORY MOTION
Filed July 13, 1923  3 Sheets-Sheet 3
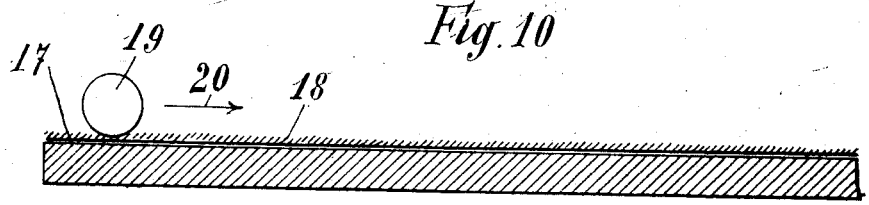
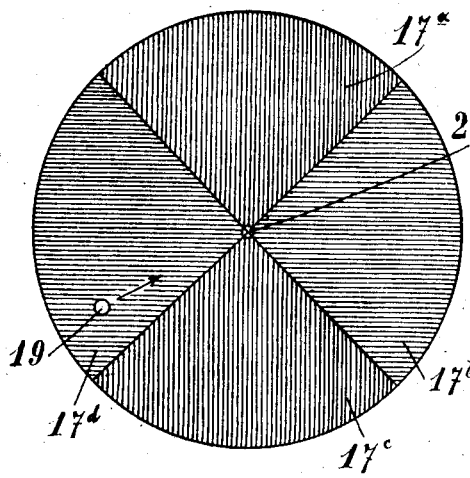
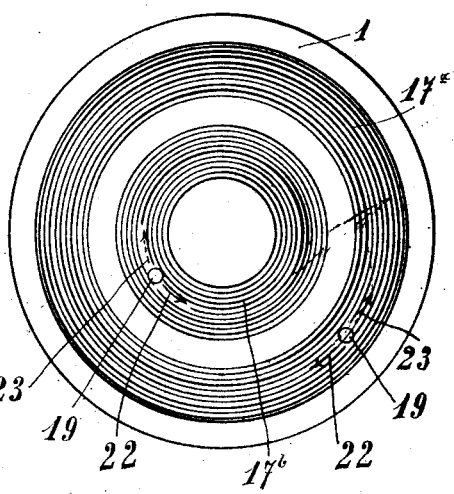
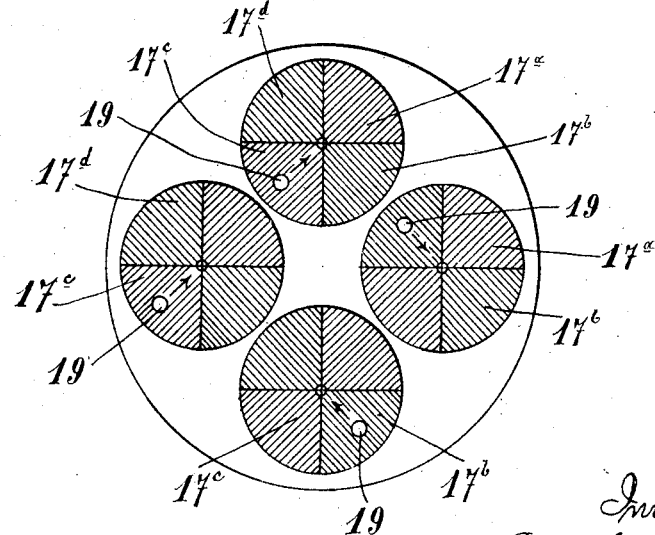
Inventor
André Garbarini, Patented Sept. 28, 1926.

1,601,247

UNITED STATES PATENT OFFICE.

ANDRÉ GARBARINI, OF COURBEVOIE, FRANCE.

APPARATUS FOR THE PRODUCTION AND MAINTENANCE AND UTILIZATION OF VIBRATORY MOTION.

Application filed July 13, 1923. Serial No. 651,333.

My invention relates to an apparatus for the production of a vibratory movement which is set up and maintained by electromagnetic or mechanical means in order to obtain the rotation, travel or like displacement upon the vibrating body or upon a device which is mounted upon the latter for exhibition of objects. The vibratory movement thus produced is available for advertising purposes, for exhibition of articles for sale or otherwise, for use as toys, for the sorting of objects of different sizes or weights, and for various other purposes of an ornamental, commercial or industrial nature, such as will be further mentioned by way of example.

In the known devices, use has been made for the exhibition of various objects such as rings, bracelets, watches and the like, of rotating supports intended to show the object on different sides, but such devices require the use of motors representing a great cost and an expensive upkeep.

By means of the vibratory motion obtained by my invention, any object disposed upon a supporting base can be made to rotate without being obliged to turn the support itself, and further, the effect is produced without requiring upkeep or lubrication, whilst the consumption of current is a minimum.

My invention consists essentially in placing the objects to be exhibited upon a supporting base or plate which is mounted upon flexible supports and is given a vibratory movement by electromagnetic or mechanical means. The electromagnetic operating device, which is preferred for this purpose, may be of the single or multiple type so as to impart to the said objects combined movements of travel and rotation. In this arrangement, the electromagnetic device acts upon elastic blades perpendicular to the vibrating disc and suitably attached thereto.

In order that the action of the moving element upon the vibrating disc shall be directed and made uniform, said disc is preferably covered with a pile fabric, velvet for example, wherein the pile is inclined, in a given direction whereby the action of the pile under the effect of the vibration shall propel the object according to the direction of its inclination. The said fabric, velvet or the like, may be disposed in any suitable manner such as by bands, sectors or the like upon the said vibrating disc so as to obtain all desired effects of displacement or exhibition of the object.

The appended drawings which are given by way of example set forth various embodiments of the invention.

Figs. 5 and 6 are respectively a side view and a horizontal section of an embodiment wherein the disc is supported by the vibrating blades themselves.

Figs. 7 and 8 illustrate diagrammatically a mechanical device for producing the vibratory motion, Fig. 7 being an elevation and Fig. 8 a partial plan view.

Fig. 9 is a detail view of the arrangement of the vibrating disc.

Fig. 10 is a section of the covering of said disc.

Fig. 11 is a plan view of a disc covered with four velvet sectors.

Fig. 12 is a like view of a vibrating disc having four circular members of a pile fabric, each member consisting of four sectors.

Fig. 13 is a plan view of a like disc with concentric velvet ring members.

Figure 1:
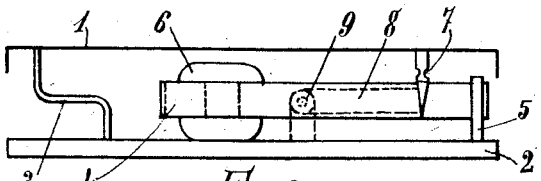
Figs. 1 and 2 are respectively a side view and a horizontal section of a vibratory apparatus with spring-mounted disc.
Figure 2:
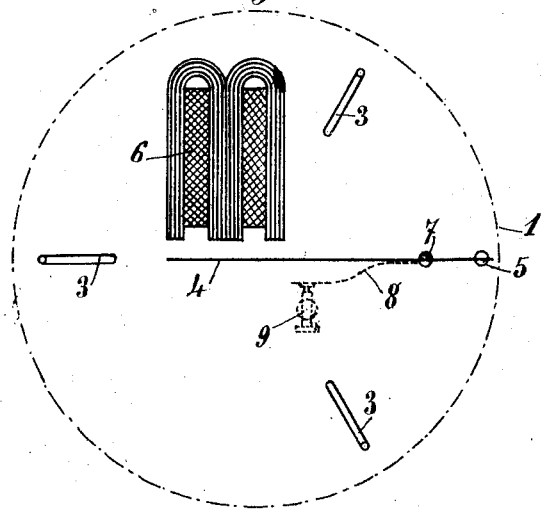

In the device shown in Figs. 1 and 2, the vibrating disc 1 is mounted upon the base 2 by means of legs 3, three for example, these being made of piano wire, brass strip or like flexible substance. The vibrating blade 4 perpendicular to said disc, is held at one end in an upright 5, the other end being situated opposite the operating electromagnet 6 the latter being preferably of the laminated core type as shewn. Below the said disc is secured a rod 7 which is slotted at the end so as to ride upon the metallic strip 4 and is provided with a narrow part whereby its elasticity shall be increased in the direction of the radius of the apparatus.

It will be understood that when alternating current is used, the successive attractions of the said electromagnet 6 upon the blade 4 will cause the same to vibrate, and by means of the rod 7, will communicate to the disc 1 a movement of rotary vibration in both directions. This vibration is extremely rapid and cannot be perceived by the eye, so that the disc seems to remain stationary, whilst the object thereon is given various movements of rotation and travel depending upon its position with respect to the centre of the table. The said object will therefore rotate in the first place and will simultaneously travel in a circular path, of varying amplitude, and this unusual effect will surprise the observers inasmuch as the support appears to be stationary.

Where continuous current is used, an auxiliary blade 8 and an adjustable contact element 9 will be employed, and the whole arrangement will constitute an automatic interrupter.

Figure 4:
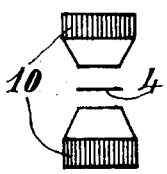
Fig. 4 is an end view of the magnet.
Figure 3:
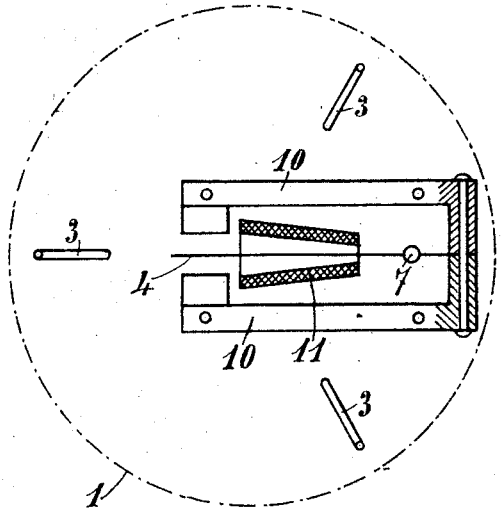
Fig. 3 is a modification shown in horizontal section.

The arrangement illustrated in Figs. 3 and 4 is similar to the one shown in Figs. 1 and 2, but in this case, the vibrating blade 4 is contained within an electromagnet 10, a flared out coil 11 producing the oscillation of the polarized blade.

In the arrangement shown in Figs. 5 and 6, the disc 1 is caused to vibrate by one, two, three or more polarized blades 4 which support the said disc. The said blades are connected with the disc 1 by means of flat springs 7 which are attached to the under side of the disc and ride over the blades 4. When a single electromagnet is used as in the example herein represented, the other blades 4 are held simply by the uprights 5 and serve to support the disc 1 through the intermediary of the members 7.

Figs. 7 and 8 illustrate a mechanical device for actuating the said disc. Upon the base 2 is mounted an electric motor 12 which actuates a cam 13 co-operating with an arm 14 secured to the under side of the disc 1.

Fig. 9 shows a particular arrangement of the said disc wherein the disc 1 is covered by a plate $1^a$ provided with a covering hereinafter described, these two parts being connected together by flanges 15 and a set screw 16. In this arrangement the upper or visible disc can be replaced with facility, where another is to be substituted.

Figs. 10 to 13 illustrate the covering whereby the motion as stated is directed and is made uniform.

The vibrating disc 1, Fig. 10, is covered with velvet or the like 17 whereof the pile is inclined in the direction indicated. Under the action of the vibration given to the disc 1, the movable object 19 which is placed loosely upon the said fabric will travel in the direction indicated by the arrow 20.

The vibrating disc, Fig. 11, is provided with a covering comprising four velvet sectors $17^a$, $17^b$, $17^c$, $17^d$ whereof the pile is directed towards the centre 21 of the disc, so that a movable object 19 placed upon one of the sectors will automatically proceed towards the centre by reason of the vibrations which are given to said disc, and upon attaining the centre of the disc, the said object 19 will assume a movement of rotation under the combined action of the four sectors.

In the modification shewn in Fig. 12, the disc 1 is provided with four circular members each consisting of four velvet sectors $17^a$, $17^b$, $17^c$, $17^d$ whose pile is inclined towards the centre of each circle, so that objects 19 placed upon a circle will proceed as stated towards the centre of the circle under the effect of the vibration of the disc. When at the respective centres, the object will assume a rotary motion as in the preceding case.

The disc 1, Fig. 13, is provided upon its surface with concentric rings made of velvet, $17^a$ and $17^b$ upon which are placed the movable objects 19, which will travel in the direction of the arrows 22 or 23 according to the direction of the pile of the fabric.

By the use of the said arrangement of vibrating disc covered with velvet or like pile fabric, I am enabled to impart to the object on the said disc a movement of displacement combined or not with a movement of proper rotation, whereby all sides of the object can be placed before the public for exhibition or advertising purposes, or otherwise for operations such as sorting of the objects, or for like uses, comprising displays of a commercial or an industrial nature. The pile fabric will have the advantage of ensuring a regulation of the movement of the said object which is so to speak independent of the vibratory motion given to the said disc and without requiring an exact regulation of the amplitude of the motion.

With the hereinbefore described arrangement of vibrating disc covered with velvet or like fabric it will be possible to cause the object to travel along a ramp which is constituted by the vibrating disc itself.

Having now described and ascertained the nature of my said invention and in what manner the same is to be performed, I declare that what I claim is:—

1. An apparatus for the production and maintenance of vibratory motion, comprising, a disc, means to guide the disc, a spring blade below and perpendicular to the disc, a support for one end of said blade, a support on the disc riding on said blade, and an electro-magnet for vibrating the blade.

2. An apparatus for the production and maintenance of vibratory motion, comprising a disc, a spring blade disposed below and perpendicular to said disc, a stationary support for one end of said blade, a support on the bottom of said disc bearing freely on the blade and movable along the latter, and means to vibrate said blade.

3. An apparatus for the productin and maintenance of a vibratory motion, comprising a disc, flexible legs supporting said disc, a spring blade disposed below and perpendicular to the said disc, a support maintaining one end of the said blade, an electromagnet acting upon the other end of said blade for vibrating the same, and a connecting member secured to said disc and bearing loosely upon said spring blade for imparting the vibratory motion to the said disc.

4. In an apparatus for the production and maintenance of vibratory motion, a platform, means to support said platform for universal movement in a substantially horizontal plane, a leaf spring perpendicular to said platform, and electric mechanism to vibrate said spring and means on the platform loosely engaging and straddling said spring.

5. In an apparatus for the production and maintenance of vibratory motion, a platform freely movable in a substantially horizontal plane, a leaf spring arranged substantially perpendicular to the platform and means on the platform arranged to ride on and along said spring, and means to vibrate the spring.

6. An apparatus for the production and maintenance of a vibratory motion, comprising a disc, a vibrating blade disposed below and perpendicular to the said disc, a support maintaining one end of the said strip, a member connecting the said strip with the disc, and a covering consisting of a pile fabric disposed upon the said disc.

7. An apparatus for the production and maintenance of a vibratory motion, comprising a disc, a vibrating blade disposed below and perpendicular to the said disc, a support maintaining one end of the said blade, an electromagnet acting upon the other end of the said blade, a member connecting the said blade with the disc, and coverings consisting of pile fabrics disposed upon the said disc and having the form of sectors.

8. In an apparatus for the production and maintenance of vibratory motion, a movable platform, means to vibrate the platform, and different portions of the platform covered with individual portions of a pile fabric, the piles of which portions are directed in different directions.

9. In an apparatus for the production and maintenance of vibratory motion, a movable platform, a leaf spring arranged horizontally beneath and perpendicular to the platform, a forked element secured to the underside of the platform and loosely riding on said spring, electric mechanism to vibrate the spring, and a pile fabric covering the platform.

In testimony that I claim the foregoing as my invention, I have signed my name.

ANDRÉ GARBARINI.